United States Patent
Wright et al.

(10) Patent No.: US 11,014,306 B2
(45) Date of Patent: May 25, 2021

(54) GENERATING THREE-DIMENSIONAL OBJECTS WITH TARGET SURFACE ROUGHNESS

(71) Applicant: Hewlett-Packard Development Company, L.P., Houston, TX (US)

(72) Inventors: Jacob Tyler Wright, San Diego, CA (US); Bernardo A. Gutierrez, San Diego, CA (US); Sergio Puigardeu Aramendia, Sant Cugat del Valles (ES); Ali Emamjomeh, San Diego, CA (US); Lihua Zhao, Sunnyvale, CA (US); Andrew E. Fitzhugh, Palo Alto, CA (US)

( * ) Notice: Subject to any disclaimer, the term of this patent is extended or adjusted under 35 U.S.C. 154(b) by 17 days.

(21) Appl. No.: 15/569,381

(22) PCT Filed: Jul. 9, 2015

(86) PCT No.: PCT/US2015/039731
§ 371 (c)(1),
(2) Date: Oct. 25, 2017

(87) PCT Pub. No.: WO2017/007486
PCT Pub. Date: Jan. 12, 2017

(65) Prior Publication Data
US 2018/0297286 A1 Oct. 18, 2018

(51) Int. Cl.
*B29C 64/393* (2017.01)
*B29C 64/165* (2017.01)
(Continued)

(52) U.S. Cl.
CPC ........ *B29C 64/393* (2017.08); *B29C 64/165* (2017.08); *B29C 64/205* (2017.08);
(Continued)

(58) Field of Classification Search
CPC ... B29C 64/393; B29C 64/386; B29C 64/205; B29C 64/165; B33Y 10/00; B33Y 50/02; B33Y 50/00; B29K 2995/0072
See application file for complete search history.

(56) References Cited

U.S. PATENT DOCUMENTS 6,530,958 B1 * 3/2003 Cima ...................... A61F 2/022
623/23.51
6,799,959 B1 * 10/2004 Tochimoto ............ B29C 64/165
425/130
(Continued)

FOREIGN PATENT DOCUMENTS

CN 100448649 C 1/2009
EP 1475220 A2 11/2004
(Continued)

OTHER PUBLICATIONS

Todd Halterman "Fonon Looks to Military Am Applications with Its 3d Fusion Laser Metal Sintering Technology", Sep. 16, 2014, pp. 2. http://www.3dprinterworld.com/article/fonon-looks-military-am-applications-with-its-3d-fusion-laser-metal-sintering-technology.
(Continued)

*Primary Examiner* — Michael M. Robinson

(57) ABSTRACT

An agent distributor may be to selectively deliver agent at a first contone density and at a second contone density different from the first contone density respectively onto an interior portion and a surface portion of successive layers of build material in respective first and second patterns in accordance with data representing a three-dimensional object to be generated, so that the build material is to solidify to form slices of the three-dimensional object in accordance with the first and second patterns, and so that the three-dimensional object is to achieve a target surface roughness as a result of the second contone density of the second pattern.

14 Claims, 4 Drawing Sheets

(51) Int. Cl.
    *B29C 64/386*     (2017.01)
    *B33Y 10/00*     (2015.01)
    *B33Y 30/00*     (2015.01)
    *B33Y 50/02*     (2015.01)
    *B29C 64/205*     (2017.01)
    *B33Y 50/00*     (2015.01)

(52) U.S. Cl.
    CPC ............ *B29C 64/386* (2017.08); *B33Y 10/00* (2014.12); *B33Y 30/00* (2014.12); *B33Y 50/02* (2014.12); *B29K 2995/0072* (2013.01); *B33Y 50/00* (2014.12)

(56) References Cited

U.S. PATENT DOCUMENTS

| | | | |
|---|---|---|---|
| 6,989,115 | B2 | 1/2006 | Russell et al. |
| 8,147,910 | B2 | 4/2012 | Kritchman |
| 8,163,077 | B2 | 4/2012 | Eron et al. |
| 2002/0079601 | A1* | 6/2002 | Russell ............... B29C 41/12 264/40.1 |
| 2002/0105114 | A1* | 8/2002 | Kubo ............... B29C 64/153 264/497 |
| 2004/0169699 | A1 | 9/2004 | Hunter et al. |
| 2004/0183796 | A1 | 9/2004 | Velde et al. |
| 2004/0222549 | A1 | 11/2004 | Sano et al. |
| 2005/0001356 | A1 | 1/2005 | Tochimoto et al. |
| 2005/0142024 | A1 | 6/2005 | Herzog |
| 2011/0076438 | A1 | 3/2011 | Farr et al. |
| 2014/0010908 | A1 | 1/2014 | Matsumoto et al. |
| 2015/0091200 | A1 | 4/2015 | Mech |
| 2016/0335781 | A1* | 11/2016 | Sano ................ B29C 64/129 |

FOREIGN PATENT DOCUMENTS

| | | |
|---|---|---|
| JP | 2000-280357 | 10/2000 |
| WO | WO-03/016030 A1 | 2/2003 |

OTHER PUBLICATIONS

International Search Report and Written Opinion dated Apr. 8, 2016, PCT Patent Application No. PCT/US2015/039731, filed Jul. 9, 2015, Korean Intellectual Property Office.

Carole Jacques, "Open Materials Development Will Be Key for HP", Nov. 11, 2014, pp. 5. http://www.luxresearchinc.com/news-and-events/press-releases/read/open-materials-development-will-be-key-hps-success-3d-printing.

* cited by examiner

GENERATING THREE-DIMENSIONAL OBJECTS WITH TARGET SURFACE ROUGHNESS

CLAIM FOR PRIORITY

The present application is a national stage filing under 35 U.S.C. § 371 of PCT application number PCT/US2015/039731, having an international filing date of Jul. 9, 2015, the disclosure of which is hereby incorporated by reference in its entirety.

BACKGROUND

Additive manufacturing systems that generate three-dimensional objects on a layer-by-layer basis have been proposed as a potentially convenient way to produce three-dimensional objects. The quality of objects produced by such systems may vary widely depending on the type of additive manufacturing technology used.

BRIEF DESCRIPTION

Some examples are described with respect to the following figures.

Figure 6A:
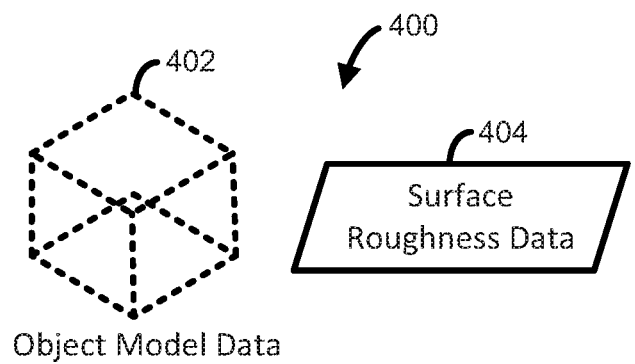
FIG. 6a shows three-dimensional object design data representing a three-dimensional object according to some examples.
Figure 6B:
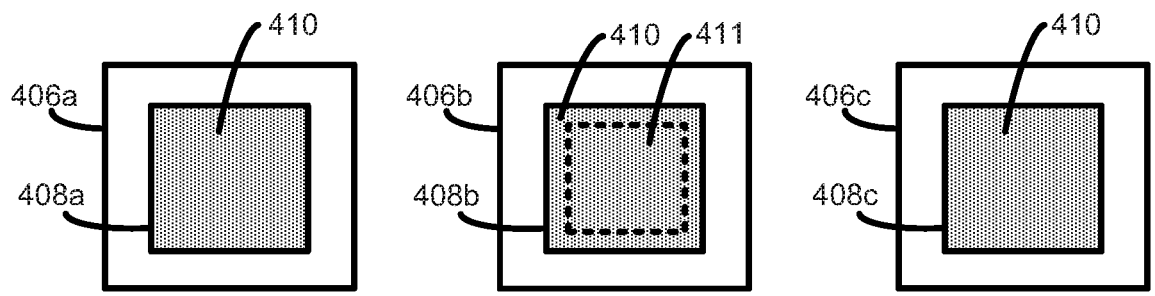
Figure 6C:
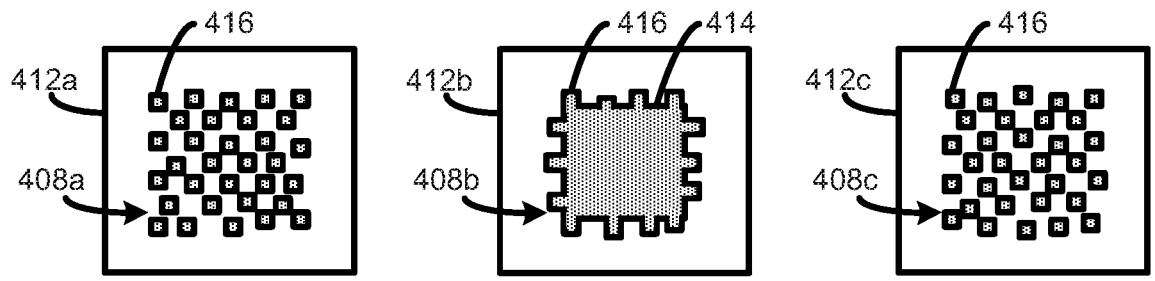
Figure 6D:
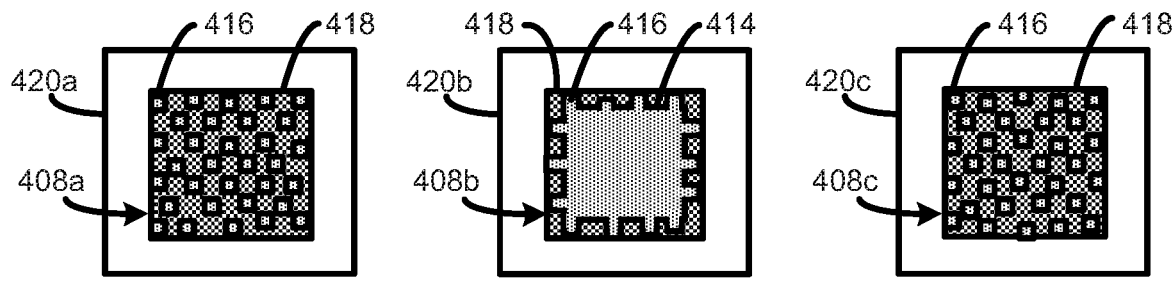

FIGS. 6b-d show slice data representing a three-dimensional object according to some examples;

FIGS. 7a-d show a series of cross-sectional side views of layers of build material according to some examples; and FIGS. 8a-d show a series of top views of layers of build material according to some examples.

DETAILED DESCRIPTION

The following terminology is understood to mean the following when recited by the specification or the claims. The singular forms "a," "an," and "the" mean "one or more." The terms "including" and "having" are intended to have the same inclusive meaning as the term "comprising."

Some additive manufacturing systems generate three-dimensional objects through the solidification of portions of successive layers of build material, such as a powdered or liquid build material. The properties of generated objects may be dependent on the type of build material and the type of solidification mechanism used. In some examples, solidification may be achieved by using an agent distributor to deliver a binder agent which binds and solidifies build material into a binder matrix, which is a mixture of generally separate particles or masses of build material that are adhesively bound together by a binder agent. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. For example, the coalescing agent may act as an absorber of applied energy such that the portions of build material having coalescing agent experience coalescence and solidification. In some examples, a multiple agent additive manufacturing system may be used such as that described in PCT Application No. PCT/EP2014/050841 filed on Jan. 16, 2014, entitled "GENERATING A THREE-DIMENSIONAL OBJECT", the entire contents of which are hereby incorporated herein by reference. For example, in addition to selectively delivering coalescing agent to layers build material, coalescence modifier agent may also be selectively delivered to layers of build material. A coalescence modifier agent may serve to modify the degree of coalescence of a portion of build material on which the coalescence modifier agent has been delivered or has penetrated. In yet other examples, other methods of solidification may be used, for example selective laser sintering (SLS), light polymerization, among others. The examples described herein may be used with any of the above additive manufacturing systems and suitable adaptations thereof.

In some examples, there may be difficulty and expense in attempting to achieve suitable surface properties of an object, for example surface smoothness and roughness. Accordingly, the present disclosure provides examples for achieving a target surface roughness by generating the object using data representing that agent is to be delivered at a first contone density of agent in an interior portion of the object, and at second contone density different from (e.g. higher or lower than) the first contone density in a surface portion of an object. In some examples, using data representing different contone densities in these different portions may allow for an effective, fast, and inexpensive way to achieve a target surface roughness. As understood herein, a surface roughness may relate to unevenness on the surface, for example due to irregularities, breaks, or projections on the surface. Thus, surface roughness is the inverse of surface smoothness, and therefore the usage herein of "surface roughness" is equivalent to the usage of "surface smoothness" except that high surface roughness is equivalent to low surface smoothness, and vice versa. As understood herein, a "contone density" is the spatial density at which drops of agent are delivered to a portion of build material.

Figure 1:
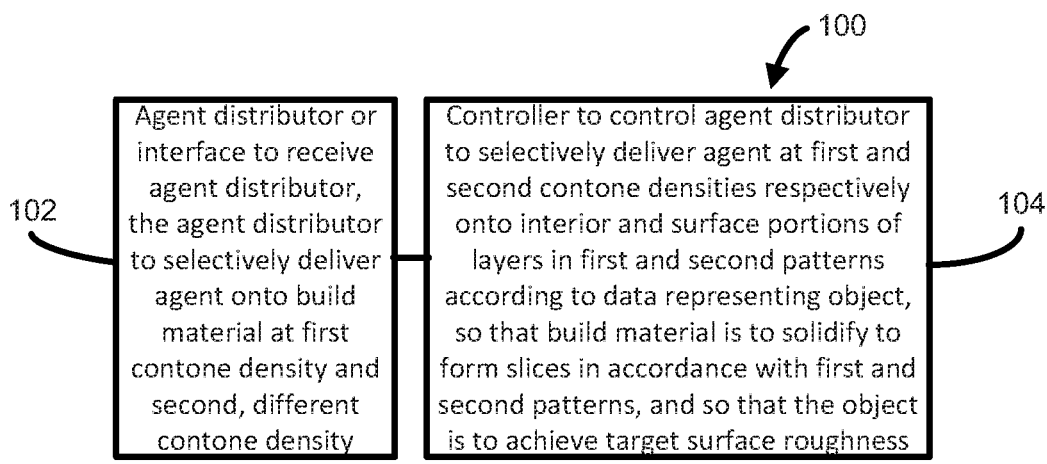
FIG. 1 illustrates a system for generating a three-dimensional object according to some examples.

FIG. 1 is a block diagram illustrating a system 100 for generating a three-dimensional object according to some examples. The system 100 may include an agent distributor or an interface to receive the agent distributor 102. The agent distributor may be to selectively deliver agent onto portions of successive layers of build material at a first contone density and at a second contone density different from the first contone density. The system 100 may include a controller 102 to control the agent distributor to selectively deliver the agent at the first and second contone densities respectively onto an interior portion and a surface portion of the layers in respective first and second patterns in accordance with data representing a three-dimensional object to be generated, so that the build material is to solidify to form slices of the three-dimensional object in accordance with the first and second patterns, and so that the three-dimensional object is to achieve a target surface roughness as a result of the second contone density of the second pattern.

Figure 2:
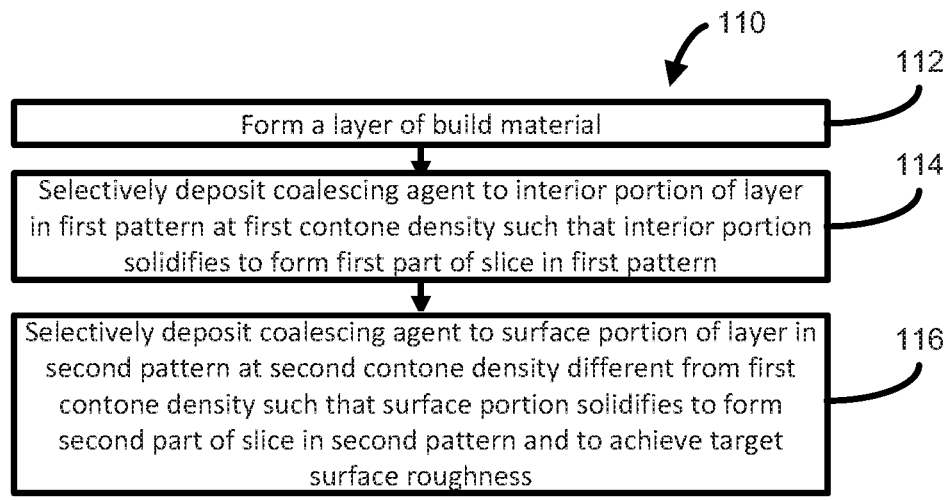
FIG. 2 is a flow diagram illustrating a method according to some examples.

FIG. 2 is a flow diagram illustrating a method 110 according to some examples. At 112, a layer of build material may be formed. At 114, coalescing agent may be selectively deposited to an interior portion of the layer in a first pattern at a first contone density such that the interior portion solidifies to form a first part of a slice of a three-dimensional object in accordance with the first pattern. At 116, coalescing agent may be selectively deposited to a surface portion of the layer in a second pattern at a second contone density different from the first contone density such that the surface portion solidifies to form a second part of the slice in accordance with the second pattern and to achieve a target surface roughness.

Figure 3:
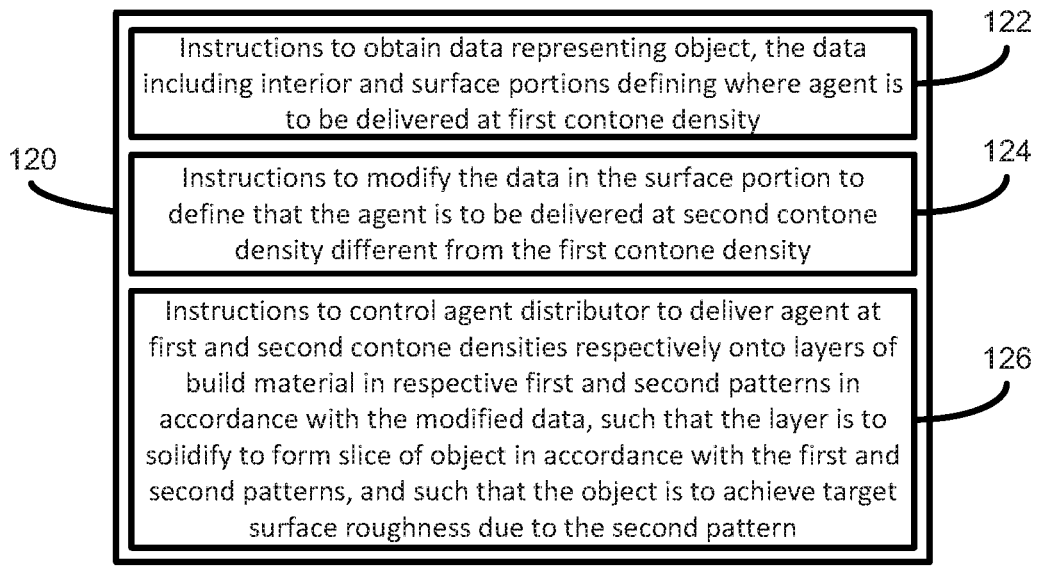
FIG. 3 is a block diagram illustrating a non-transitory computer readable storage medium according to some examples.

FIG. 3 is a block diagram illustrating a non-transitory computer readable storage medium 120 according to some examples. The medium 120 may include instructions 122 that when executed by a processor, cause the processor to obtain data representing a three-dimensional object to be generated. The data may include interior and surface portions defining where agent is to be delivered at a first contone density. The medium 120 may include instructions 124 that when executed by a processor, cause the processor to modify the data in the surface portion to define that the agent is to be delivered at a second contone density different from the first contone density. The medium 120 may include instructions 126 that when executed by a processor, cause the processor to control an agent distributor to deliver the agent at the first and second contone densities respectively onto layers of build material in respective first and second patterns in accordance with the modified data, such that the layer is to solidify to form a slice of the three-dimensional object in accordance with the first and second patterns, and such that the three-dimensional object is to achieve a target surface roughness due to the second pattern.

Figure 4:
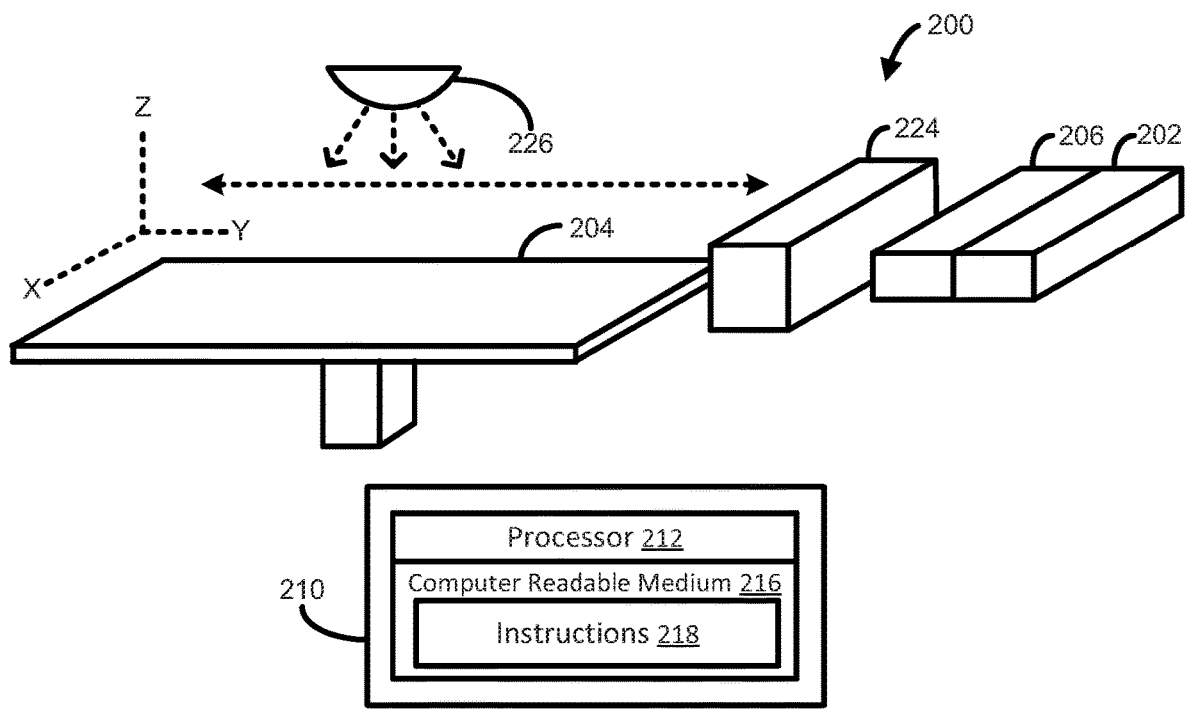
FIG. 4 is a simplified isometric illustration of an additive manufacturing system according to some examples.

FIG. 4 is a simplified isometric illustration of an additive manufacturing system 200 according to some examples. The system 200 may be operated as described further below with reference to the flow diagram of FIG. 5 to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

The additive manufacturing system 200 may include a system controller 210. Any of the operations and methods disclosed herein (e.g. in FIG. 5) may be implemented and controlled in the additive manufacturing system 200 and/or controller 210. A controller, as understood herein, comprises (1) a non-transitory computer-readable storage medium comprising instructions to perform operations and methods disclosed herein, and a processor or circuitry coupled to the non-transitory computer-readable storage medium to execute the instructions; or comprises (2) circuitry to perform the operations and methods disclosed herein.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

In some examples, the controller 210 may support direct user interaction. For example, the additive manufacturing system 200 may include user input devices coupled to the processor 212, such as a keyboard, touchpad, buttons, keypad, dials, mouse, track-ball, card reader, or other input devices. Additionally, the additive manufacturing system 200 may include output devices coupled to the processor 212, such as a liquid crystal display (LCD), video monitor, touch screen display, a light-emitting diode (LED), or other output devices. The output devices may be responsive to instructions to display textual information or graphical data. The processor 212 may be in communication with a computer-readable storage medium 216 via a communication bus. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any of the methods or operations disclosed herein according to various examples. In other examples, the controller 210 may not include a computer-readable storage medium 216, and the processor may comprise circuitry to perform any of the methods or operations disclosed herein without executing separate instructions in a computer-readable storage medium.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light enhancers are dye based colored ink and pigment based colored ink, such as inks commercially known as CM993A and CE042A available from Hewlett-Packard Company.

The system 200 may also include a coalescence modifier agent distributor 206 to selectively deliver coalescence modifier agent to a layer of build material provided on the support member 204. A coalescence modifier agent may serve to modify, e.g. reduce or increase, the degree of coalescence of a portion of build material on which the coalescence modifier agent has been delivered or has penetrated. Different physical and/or chemical effects may be used to modify the effects of a coalescing agent. An example of a coalescence modifier agent that may reduce the degree of coalescence may, for example, be a colloidal ink, a fully water soluble ink, a polymer-based ink, a salt solution, or an agent comprising a high percentage of water. An example of a coalescence modifier agent that may increase the degree of coalescence may, for example, be a surface tension modifier to increase the wettability of particles of build material, or a suitable plasticizer.

Although the description of agent distributor 202 is described herein as delivering coalescing agent, it is understood that in some examples, binder agent may be delivered by the agent distributor 202 rather than coalescing agent. Thus, the disclosure herein is intended to encompass examples in which binder agent is used in place of coalescing agent.

The controller 210 may control the selective delivery of the agents to a layer of provided build material in accordance with the instructions 218.

The agent distributors 202 and 206 may be printheads, such as a thermal inkjet printheads or a piezo inkjet printheads. In one example, printheads such as those commonly used in commercially available inkjet printers may be used. In other examples, the agents may be delivered through spray nozzles rather than through printheads. Other delivery mechanisms may be used as well.

The coalescing agent distributor 202 may include a supply of coalescing agent or may be connectable to a separate supply of coalescing agent. The coalescing agent distributor 206 may include a supply of coalescence modifier agent or may be connectable to a separate supply of coalescence modifier agent.

The agent distributors 202 and 206 may be used to selectively deliver, e.g. deposit, agents when in the form of suitable fluids such as a liquid. In some examples, the agent distributors 202 and 206 may have arrays of nozzles through which the agent distributors 202 and 206 are to selectively eject drops of fluid. In some examples, each drop may be in the order of about 10 pico liters (pl) per drop, although in other examples the agent distributors 202 and 206 are able to deliver a higher or lower drop size. In some examples, each drop may be in the order of about 5 nanograms to about 20 nanograms, although in other examples the agent distributors 202 and 206 are able to deliver drops having higher or lower masses. In some examples, the agent distributors 202 and 206 are able to deliver variable size and variable mass drops.

In some examples, the agent distributors 202 and 206 may be to selectively deliver drops of agents at variable (e.g. different) contone densities. In some examples, in interior and surface portions of an object, the contone densities may be between about 0.25 to about 4 drops, or between about 0.5 to about 2 drops (e.g. 0.5 drops, 1 drop, or 1.5 drops, or 2 drops) per 600 dpi (dots per inch) i.e. $\frac{1}{600} \times \frac{1}{600}$ inch region ($\frac{1}{360,000}$ square inches). In some examples, the contone density in the surface portions may be selected to achieve a target surface roughness. In other examples, the agent distributors 202 and 206 may be to deliver drops of agents at higher or lower contone densities.

In some examples the coalescing agent may comprise a liquid carrier, such as water or any other suitable solvent or dispersant, to enable it to be delivered via a printhead.

In some examples the printheads may be drop-on-demand printhead. In other examples the printhead may be continuous drop printhead.

In some examples, the agent distributors 202 and 206 may be integral parts of the system 200. In some examples, the agent distributors 202 and 206 may be user replaceable, in which case they may be removably insertable into suitable agent distributor receivers or interface of the system 200.

In some examples a single agent distributor, such as a printhead, may be used to selectively deliver both coalescing agent and coalescence modifier agent. For example, a first set of nozzles of the agent distributor may be to deliver coalescing agent, and a second set of nozzles of the agent distributor may be to deliver coalescence modifier agent.

In the example illustrated in FIG. 4, the agent distributors 202 and 206 may have lengths that enables then to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributors 202 and 206 may have shorter lengths that do not enable them to span the whole width of the support member 204.

The agent distributors 202 and 206 may be mounted on a moveable carriage to enable them to move bi-directionally across the length of the support member 204 along the illustrated y-axis. This enables selective delivery of agents across the whole width and length of the support member 204 in a single pass. In other examples the agent distributors 202 and 206 may be fixed, and the support member 204 may move relative to the agent distributors 202 and 206.

In other examples, the agent distributors 202 and 206 may be fixed, and the support member 204 may move relative to the agent distributors.

It should be noted that the term 'width' used herein is used to generally denote the shortest dimension in the plane parallel to the x and y axes illustrated in FIG. 4, whilst the term 'length' used herein is used to generally denote the longest dimension in this plane. However, it will be understood that in other examples the term 'width' may be interchangeable with the term 'length'. For example, in other examples the agent distributors 202 and 206 may have lengths that enables them to span the whole length of the support member 204 whilst the moveable carriage may move bi-directionally across the width of the support member 204.

In another example the agent distributors 202 and 206 do not have lengths that enables them to span the whole width of the support member but are additionally movable bi-directionally across the width of the support member 204 in the illustrated x-axis. This configuration enables selective delivery of agents across the whole width and length of the support member 204 using multiple passes. Other configurations, however, such as a page-wide array configuration, may enable three-dimensional objects to be created faster.

The system 200 may further comprise a build material distributor 224 to form successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to form a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module. In some examples, the build material distributor 224 may be mounted on a carriage.

In some examples, the thickness of each layer may have a value selected from the range of between about 15 to about 300 microns, or about 15 to about 200 microns, or about 50 to about 200 microns, 90 to about 110 microns, or about 250 microns, although in other examples thinner or thicker layers of build material may be provided. The thickness may be controlled by the controller 210, for example based on the instructions 218.

In some examples, there may be any number of additional agent distributors and build material distributors relative to the distributors shown in FIG. 4. In some examples, the distributors of system 200 may be located on the same carriage, either adjacent to each other or separated by a short distance. In other examples, two or more carriages each may contain a distributor. For example, each distributor may be located in its own separate carriage. Any additional distributors may have similar features as those discussed earlier with reference to the coalescing agent distributors 202 and 206. However, in some examples, different agent distributors may deliver different coalescing agents and/or coalescence modifier agents, for example.

In the example shown the support member 204 is moveable in the z-axis such that as new layers of build material are deposited a predetermined gap is maintained between the surface of the most recently deposited layer of build material and lower surface of the agent distributors 202 and 206. In other examples, however, the support member 204 may not be movable in the z-axis and the agent distributors 202 and 206 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support member 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on a moveable carriage.

In other examples, the energy source 226 may apply a variable amount of energy as it is moved across the layer of build material, for example in accordance with instructions 218. For example, the controller 210 may control the energy source to apply energy to portions of build material on which coalescing agent has been applied but not to portions of build material on which coalescing agent has not been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that: i) portions of the build material on which no coalescing agent have been delivered do not coalesce when energy is temporarily applied thereto; ii) portions of the build material on which coalescing agent, but not coalescence modifier agent, has been delivered or has penetrated coalesce when energy is temporarily applied thereto do coalesce; iii) portions of the build material on which coalescence modifier agent, but not coalescing agent, has been delivered or has penetrated do not coalesce when energy is temporarily applied thereto; and iv) portions of the build material on which both coalescing agent and coalescence modifier agent have been delivered or have penetrated may undergo a modified degree of coalescence. The degree of modification may depend on the properties, proportions, and delivery patterns of the coalescing agent and the coalescence modifier agent, the properties of the build material, and the chemical interactions between the coalescing agent, coalescence modifier agent, and build material.

Although not shown in FIG. 4, in some examples the system 200 may additionally comprise a pre-heater to maintain build material deposited on the support member 204 within a predetermined temperature range. Use of a pre-heater may help reduce the amount of energy that has to be applied by the energy source 226 to cause coalescence and subsequent solidification of build material on which coalescing agent has been delivered or has penetrated.

Figure 5:
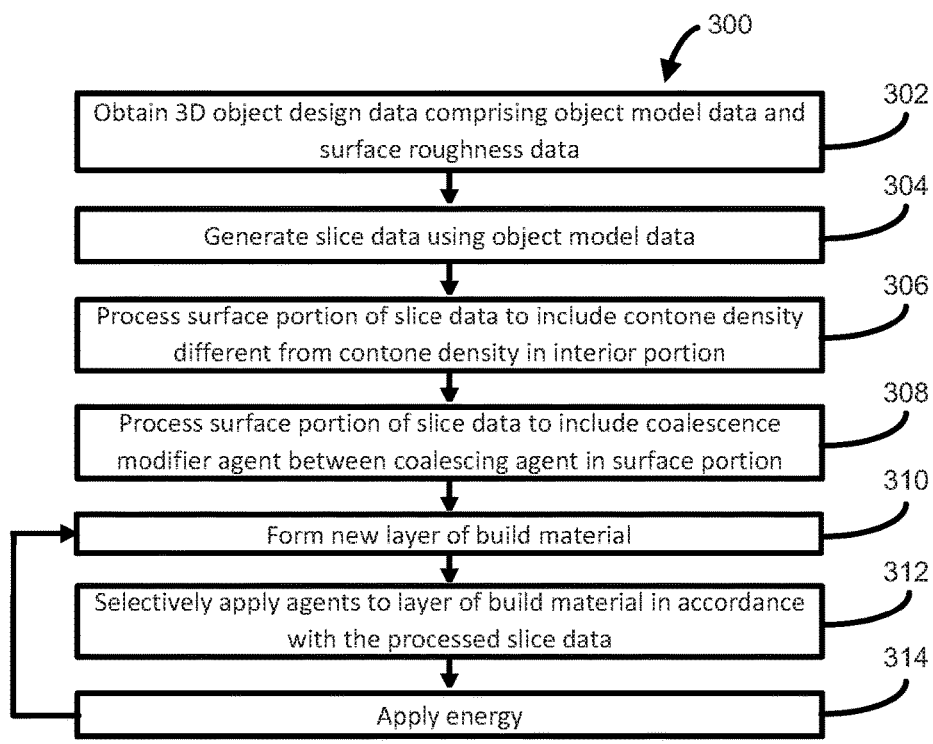
FIG. 5 is a flow diagram illustrating a method of generating a three-dimensional object according to some examples.

FIG. 5 is a flow diagram illustrating a method 300 of generating a three-dimensional object according to some examples. In some examples, the orderings shown may be varied, some elements may occur simultaneously, some elements may be added, and some elements may be omitted.

Figure 7A:
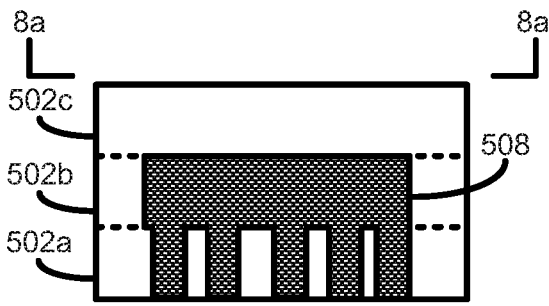
Figure 8A:
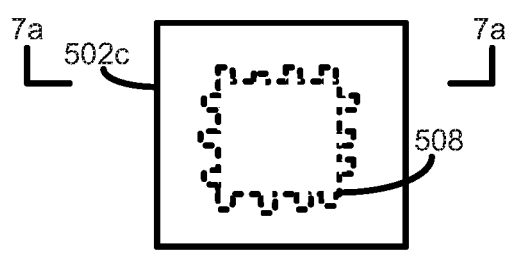
Figure 7B:
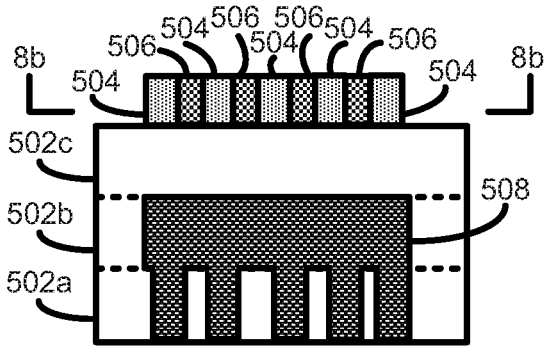
Figure 8B:
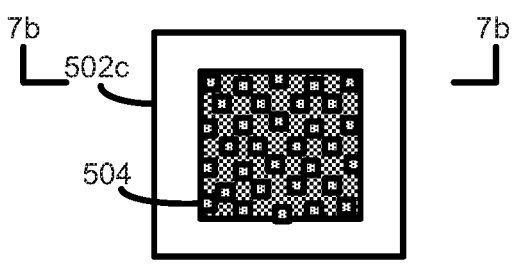
Figure 7C:
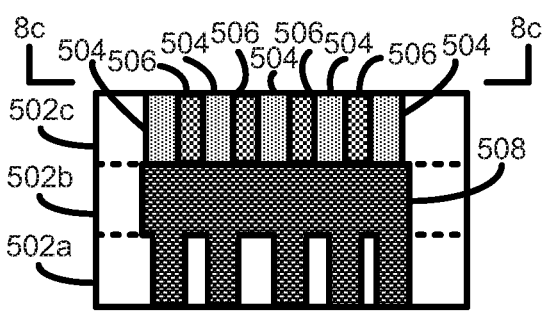
Figure 8C:
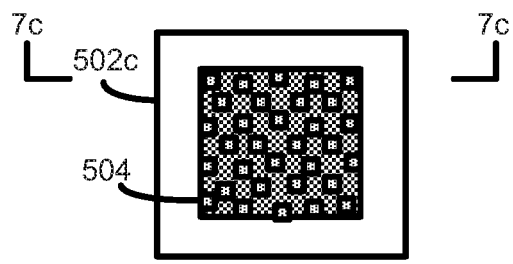
Figure 7D:
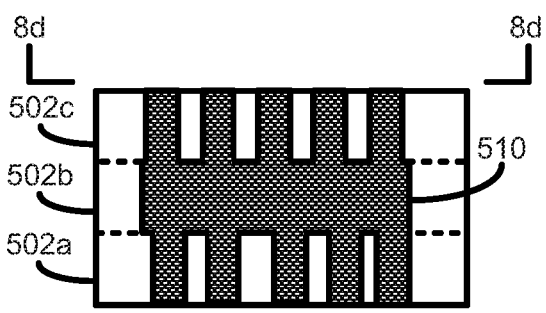
Figure 8D:
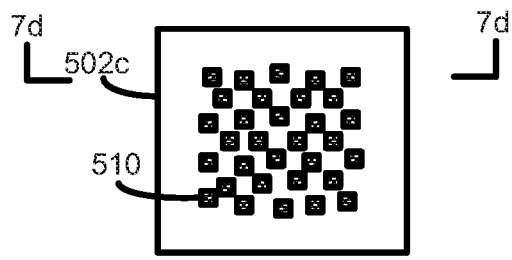

In describing FIG. 5, reference will be made to FIGS. 4, 6a-c, 7a-d, and 8a-d. FIG. 6a shows three-dimensional object design data representing a three-dimensional object according to some examples. FIG. 6b-d show slice data representing a three-dimensional object according to some examples. FIGS. 7a-d show a series of cross-sectional side views of layers of build material according to some examples. FIGS. 8a-d show a series of top views of layers of build material according to some examples. A top view of layers along line 6a-6a of FIG. 7a is shown in FIG. 8a, and a cross sectional side view along lines 5a-a of FIG. 8a is shown in FIG. 7a. A top view of layers along line 6b-6b of FIG. 7b is shown in FIG. 8b, and a cross sectional side view along lines 5b-b of FIG. 8b is shown in FIG. 7b. A top view of layers along line 6c-6c of FIG. 7c is shown in FIG. 8c, and a cross sectional side view along lines 5c-c of FIG. 8c is shown in FIG. 7c. A top view of layers along line 6d-6d of FIG. 7d is shown in FIG. 8d, and a cross sectional side view along lines 5d-d of FIG. 8a is shown in FIG. 7d. It should be understood that FIGS. 6a-c, 7a-d, and 8a-d are highly schematic. For example, the illustrated dimensions including lengths and widths are not necessarily scaled in a way representative of actual generation of the three-dimensional object.

At 302, three-dimensional object design data 400 may be obtained, e.g. received or generated, by the controller 210. As shown in the example of FIG. 6a, three-dimensional object design data 400 may include object model data 402 representing a three-dimensional model of an object to be generated, and/or object property data representing properties of the object, including but not limited to surface roughness data 404, density data, strength data, and the like. The object model data 402 may define the solid portions of the object, and the surface roughness data 404 may define target roughness of the surface of the object. In some examples, different portions of the surface may have different target roughnesses. For example, the object model data 402 shows six surfaces on a cuboid shaped object. Each of the six surfaces may have a different target surface roughness. In some examples, each of the six surfaces may itself have different target roughnesses for different portions of the respective surface. In some examples, the surface roughness data 404 may include target roughnesses for some surfaces but not for other surfaces.

The three-dimensional object design data 400 may be received, for example, from a user via an input device 220, as input from a user, from a software driver, from a software application such as a computer aided design (CAD) application, or may be obtained from a memory storing default or user-defined object design data and object property data.

At 304, the object model data 402 may be processed by the controller 210 or a three-dimensional object processing system to generate slice data 406a-c representing slices 408a-c of parallel planes of the model, as shown in FIG. 6b. Each slice 408a-c may define a portion of a respective layer of build material that is to be solidified by the additive manufacturing system 200. In the example of FIG. 6b, slice 408a may be a bottom slice the object, slice 408b may be a middle slice of the object, and slice 408c may be a top slice of the object. For illustrative purposes three slices are shown, however the object may have a greater number of slices, for example hundreds or thousands of slices. For example, the object may include hundreds or thousands of middle slices rather than the one middle slice 408b shown in FIG. 6b.

The slice data 406a-c may undergo transformations, e.g. by the controller 210, from (1) vector slice data representing slices of the object in a vector format, to (2) contone slice data representing slices of the object in a bitmap or rasterized format, to (3) halftone slice data representing locations or patterns in which drops of agent are to be deposited on a layer of build material for each slice of the object, to (4) mask slice data representing the timing of when drops of agents are to be deposited in locations, portions, or patterns on a layer of build material for each slice of the object, e.g. using nozzles of agent distributors 202 and 206. In the halftone slice data and mask slice data, the slices to become solid may be represented by portions where coalescing agent is to be delivered.

At 306, using the surface roughness data 404, the slice data 406a-c may be processed to modify a surface portion 410 of the slices 408a-c in the slice data 406a-c to achieve a target surface roughness of the object. This may generate slice data 412a-c of FIG. 6c. The processing may, for example, be performed after the slice data has been transformed into halftone slice data (in which case the halftone slice data may later be transformed into mask slice data) or into mask slice data. However, in other examples, the processing may be performed on any data representing the three-dimensional object, for example, any data defining the object from its initial generation as three dimensional object design data to its conversion into any type of slice data such as those described earlier.

The surface portion 410 may represent portions of the object to be generated that may be adjacent to the exterior surface to the object. The surface portions may extend a predetermined depth into the object. In some examples, the predetermined depth may be equal to the thickness of an integer number of layers of build material, for example one layer (e.g. 15 to about 200 microns, or other layer thicknesses, as discussed earlier), two layers, three layers, etc. In other examples, the predetermined depth may not be equal to a thickness of an integer number of layers. In some examples, an interior portion 411 interior to the surface portion 410 may be included in slice data, e.g. in slice data 406b having middle slice 408b. In some examples, the interior portion 411 may represent part of the object that not represented by the surface portion 410. In some examples, the interior portion 411 may represent the entire remainder of the object that is not represented by the surface portion 410, rather than just a part of the object that is not represented by the surface portion 410.

As shown in FIG. 6b, in some examples, the entire bottom slice 408a and the entire top slice 408c may be part of the surface portion. However, for the middle slice 408b, a portion of the middle slice 408b that extends from the exterior surface of the object to the interior of the object up to the predetermined depth may be part of the surface portion 410, whereas the portion of the middle slice 408b that is farther from the exterior surface than the predetermined depth may be part of the interior portion 411. As discussed earlier, there may be a large number of middle slices 408b, and in some examples each of the middle slices 408b may include parts of the surface portion 410 and parts of the interior portion 411.

In some examples, the surface portion 410 may be modified such that a different contone density of coalescing agent to be delivered relative to the contone density of coalescing agent to be delivered in the interior portion 411. In the examples of FIGS. 6b-6d, the contone density of the surface portion 410 is lower than the contone density of the interior portion 411. However, in other examples, the contone density of the surface portion 410 may be higher than the contone density of the interior portion 411.

In some examples, before processing, the surface portion 410 and interior portion 411 may each define that coalescing agent is to be delivered at a contone density selected from the range between about 0.25 to about 4 drops, or between about 0.5 to about 2 drops (e.g. 0.5 drops, 1 drop, or 1.5 drops, or 2 drops) per 600 dpi (dots per inch) i.e. $\frac{1}{600} \times \frac{1}{600}$ inch region ($\frac{1}{360,000}$ square inches). In these examples, drops of coalescing agent may be delivered such that the drops may overlap with each other when delivered, or such that the drops may have a small amount of spacing therebetween. In FIG. 6c, the drops 414 are shown corresponding to interior portion 411 defining a region where coalescing agent is to be delivered.

After processing, the contone density of the interior portion 411 may not be modified, however the contone density of the surface portion 410 may be modified to a different value selected from the range between about 0.25 drops to about 4 drops per 600 dpi (dots per inch) i.e. ⅟₆₀₀×⅟₆₀₀ inch region (⅟₃₆₀,₀₀₀ square inches). In some examples, the processing may result in drops of coalescing agent being delivered in the surface portion 410 such that the drops may not overlap with each other, or may substantially not overlap with each overlap (e.g. may have minimal overlap). In some examples, the processing may result in drops which are about 200 microns in diameter on build material, and which are separated from one another by about 500 microns. In FIG. 6c, the drops 416 of coalescing agent to be delivered are shown in a surface portion corresponding to the surface portion 410. The spacing of the drops 416 may cause the surface portion 410 to have a roughness greater than the interior portion 411, which may have less spacing between drops 414. In other examples, lower roughness in the surface portion 410 may involve more spacing between drops 414 in the interior portion 411 relative to drops 416 in the surface portion 416.

Different patterns of coalescing agent may be used in the surface portion 410 as defined in the slice data 412a-c after processing. For example, as shown in FIG. 6c, the pattern may be a randomized close packed hexagonal dot pattern. For example, a close packed hexagonal dot pattern may initially be generated with equal spacing between dots, after which randomization may randomly displace some or all of the dots to create the randomized close packed hexagonal dot pattern. In some examples, other patterns may be used, e.g. a cluster dot dither pattern, void and cluster dither pattern, or air diffusion pattern.

The example of FIGS. 6c shows the same pattern and same contone density being used throughout the surface portion 410. In other examples, different patterns and different contone densities may be used in different parts of the surface portion 410, for example to achieve different surface roughnesses on different parts of the exterior surface of the object, as discussed earlier.

At 308, the slice data 412a-c may be processed to include portions (corresponding to surface portion 410 of FIG. 6b) in which coalescence modifier agent is to be delivered. This may generate slice data 420a-c of FIG. 6d. In some examples, the coalescence modifier agent may serve to reduce or prevent coalescence in portions where it is delivered. Representations of drops 418 of coalescence modifier agent may be included in portions between the representations of drops 416 of coalescing agent. Thus, the drops 418 of coalescence modifier agent may be to fill in spaces between the drops 416 of coalescing agent in the surface portion corresponding to the surface portion 410 of FIG. 6b. The slice data 412a-c may define any suitable contone density and pattern of drops 418 of coalescence modifier agent such that the coalescence modifier agent may be to successfully reduce or prevent coalescence in the portions where the drops 418 are delivered. In some examples, the combination of coalescing gent and coalescence modifier agent may be delivered at a combined contone density, e.g. a combined contone density of 0.50 drops per 600 dpi comprising 0.375 drops per 600 dpi of coalescing agent and 0.125 drops per 600 dpi of coalescence modifier agent.

In some examples, reduction or prevent of coalescence in the portions where the drops 418 are delivered may be to counteract unintended solidification in the portions where the coalescing agent is not delivered but in which the drops 418 of coalescing are delivered. This unintended solidification may occur because energy absorbed by build material on which coalescing agent has been delivered or has penetrated may also propagate into surrounding build material. Thus, portions of the build material may be heated to a temperature suitable to cause softening and bonding of build material. This may result in the subsequent solidification of portions of the build material that were not intended to be solidified and this effect is referred to herein as coalescence bleed. Coalescence bleed in the portions between the drops 416 may result, for example, in a reduction in surface roughness or an undesired surface roughness due to a smoother pattern of solidification on the surface.

In some examples, usage of the coalescence modifier agent may allow for enhanced tuning of the surface roughness by allowing creation of higher frequency patterns of coalescing agent, e.g. smaller and more tightly spaced solidified portions created where drops 416 of coalescing agent are delivered. In some examples, usage of the coalescence modifier agent may also allow for higher amplitude of surface roughness.

In some examples, coalescence modifier agent may not be used, in which case 308 may not be performed, and slice data 412a-c may, for example, be the data used for generating the object, instead of slice data 420a-c.

In some examples, slice data representing separate slices may be processed as in 304 to 308 during printing in 310 to 314, e.g. slice data representing the particular slice to be printed in the particular iteration of 310 to 314 may be processed e.g. before applying agents at 312.

At 310, a layer 502c of build material may be provided, as shown in FIGS. 7a and 8a. For example, the controller 210 may control the build material distributor 224 to form the layer 502c on previously completed layers 502a-b on the support member 204 by causing the build material distributor 224 to move along the y-axis as discussed earlier. The completed layers 502a-b may include a solidified portion 508. The solidified portion 508 is also shown in FIG. 8a as a dashed line to indicate that it is formed in layers 502a-b beneath the newly formed layer 502c. Although the layers 502a-b is shown as completed in FIGS. 7a-d for illustrative purposes, it is understood that 310 to 314 may initially be applied to generate the layers 502a-b using the data representing the three-dimensional object, for example the slice data 420a-b if coalescence modifier agent is used or the slice data 412a-b if coalescence modifier agent is not used.

In some examples, after applying the layer 502c, the layer 502c of build material may be heated by the heater to heat and/or maintain the build material within a predetermined temperature range. The predetermined temperature range may, for example, be below the temperature at which the build material would experience bonding in the presence of coalescing agent 504. For example, the predetermined temperature range may be between about 155 and about 160 degrees Celsius, or the range may be centered at about 160 degrees Celsius. Pre-heating may help reduce the amount of energy that has to be applied by the energy source 226 to cause coalescence and subsequent solidification of build material on which coalescing agent has been delivered or has penetrated.

At 312, as shown in FIGS. 7b and 8b, coalescing agent 504 and coalescence modifier agent 506 may be selectively delivered in respective patterns to the surface of portions of the layer 502c in accordance with the slice data 420c (or slice data 412c if coalescence modifier agent is not used). The slice data 420c (or slice data 412c) may defining a slice 408c that is to become solid to form part of the three-dimensional object being generated using coalescing agent 504, as shown in FIGS. 7b and 8b. The agent distributors 202 and 206 may deliver agents at contone densities and patterns defined in the slice data 420c (or slice data 412c), for example in the form of fluids such as liquid droplets. For example, the coalescing agent 504 may be selectively delivered to at first contone density onto an interior portion of the layer 502c corresponding to the interior portion of the slice data 420c (or slide data 412c), and at a second contone density different from (e.g. higher or lower than) the first contone density onto a surface portion of the layer 502c corresponding to the surface portion of the slice data 420c (or slice data 412c). "Selective delivery" means that agent may be delivered to selected portions of the surface layer of the build material in various patterns. In some examples, binder agent may be used rather than coalescing agent, the data of FIGS. 6a-6c may represent delivery of binder agent rather than coalescing agent.

FIGS. 7c and 8c show coalescing agent 504 and coalescence modifier agent 506 having penetrated substantially completely into the portions of the layer 502c of build material, but in other examples, the degree of penetration may be less than 100%. The degree of penetration may depend, for example, on the quantity of agent delivered, on the nature of the build material, on the nature of the agent, etc.

At 318, a predetermined level of energy may be temporarily applied to the layer 502c of build material. In various examples, the energy applied may be infra-red or near infra-red energy, microwave energy, ultra-violet (UV) light, halogen light, ultra-sonic energy, or the like. The temporary application of energy may cause the portions of the build material on which coalescing agent 504 was delivered to heat up above the melting point of the build material and to coalesce. In some examples, the energy source 226 may be focused. In other examples, the energy source 226 may be unfocused, and the temporary application of energy may cause the portions of the build material on which coalescing agent 504 has been delivered or has penetrated to heat up above the melting point of the build material and to coalesce. For example, the temperature of some or all of the layer 502c may achieve about 220 degrees Celsius. Upon cooling, the portions having coalescing agent 504 may coalesce may become solid and form part of the three-dimensional object being generated, as shown in FIGS. 7d and 8d.

As discussed earlier, the solidified portion 508 may have been generated in a previous iterations in generating slices in the layers 502a-b. The heat absorbed during the application of energy may propagate to the previously solidified portion 508 to cause part of portion 508 to heat up above its melting point. This effect helps creates a portion 510 that has strong interlayer bonding between adjacent layers of solidified build material, as shown in FIG. 7d. The portions having coalescence modifier agent 506 may achieve minimal or no solidification, such that the surface of the solidified portion 510 may, for example, be accurately defined with high resolution to achieve target surface roughnesses.

In some examples, the energy may not be applied, for example if binder agent is used, or if the coalescing agent 504 is to cause coalescence and solidification of build material without use of the energy source 226.

In the illustrative example shown, the object has slices three layers 502a-b, so the method 300 may be completed. However, if an object being generated is not yet completed, then after a layer of build material has been processed as described above in 310 to 314, new layers of build material may be provided on top of the previously processed layer of build material. In this way, the previously processed layer of build material acts as a support for a subsequent layer of build material. The process of 310 to 314 may then be repeated to generate a three-dimensional object layer by layer.

All of the features disclosed in this specification (including any accompanying claims, abstract and drawings), and/or all of the elements of any method or process so disclosed, may be combined in any combination, except combinations where at least some of such features and/or elements are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. An additive manufacturing system comprising:
   a coalescing agent distributor or an interface to receive the coalescing agent distributor, the coalescing agent distributor to selectively deliver a coalescing agent onto portions of successive layers of build material at a first contone density and at a second contone density different from the first contone density, wherein the coalescing agent is to cause build material on which the coalescing agent has been delivered to coalesce when an energy is applied;
   a coalescence modifier agent distributor or an interface to receive the coalescence modifier agent distributor, the coalescence modifier agent distributor to selectively deliver coalescence modifier agent onto the successive layers of build material, wherein the coalescence modifier agent is to reduce or prevent coalescence of build material on which the coalescence modifier agent has been delivered when the energy is applied;
   a controller; and
   a memory on which is stored instructions that cause the controller to:
      determine a target surface roughness for a surface portion of the successive layers of build material;
      determine a pattern among a plurality of patterns at which the coalescing agent and the coalescence modifier agent are to be delivered to achieve the target surface roughness, the determined pattern at which the coalescing agent is to be delivered to result in the second contone density;
      control the coalescing agent distributor to selectively deliver the coalescing agent at the first and second contone densities respectively onto an interior portion and the surface portion of the successive layers of build material, wherein the second contone density includes formation of spaces between drops of the coalescing agent; and
      control the coalescence modifier agent distributor to selectively deliver the coalescence modifier agent in at least some of the spaces between the drops of the coalescing agent.

2. The additive manufacturing system of claim 1, comprising an energy source to apply energy to the successive layers of build material, wherein the controller is to control the energy source to apply the energy to the successive layers of build material to cause the successive layers of the build material to coalesce and solidify to form slices of a three-dimensional object.

3. The additive manufacturing system of claim 1, wherein the instructions cause the controller to control the coalescence modifier agent distributor to selectively deliver drops of the coalescence modifier agent at a third pattern to result in a first coalescence modifier agent density, and wherein the second contone density and the first coalescence modifier agent density results in a predetermined combined contone density.

4. The additive manufacturing system of claim 1, wherein each layer of the successive layers includes a predetermined thickness and where the surface portion has a predetermined depth into a three-dimensional object that is equal to the predetermined thickness of a single layer or a multiple of the predetermined thickness of a single layer.

5. The additive manufacturing system of claim 1, where the surface portion extends through an entire surface of a three-dimensional object and completely surrounds the interior portion.

6. The additive manufacturing system of claim 1, wherein each of the first and second contone densities is between about 0.25 to 4 drops of coalescing agent per 1/360000 square inches.

7. The additive manufacturing system of claim 1, wherein data representing a three-dimensional object comprises halftone slice data or mask slice data representing slices of the three-dimensional object.

8. The additive manufacturing system of claim 7, wherein the controller is to:
obtain three-dimensional object design data comprising object model data and surface roughness data;
generate slice data using the three-dimensional object design data; and
process the slice data to represent that the coalescing agent is to be delivered at the second contone density in the surface portion.

9. The additive manufacturing system of claim 1, wherein the second contone density is lower than the first contone density.

10. The additive manufacturing system of claim 1, wherein the determined pattern is a randomized close packed hexagonal dot pattern, cluster dot dither pattern, void and cluster dither pattern, or air diffusion pattern.

11. The additive manufacturing system of claim 1, wherein the coalescing agent distributor is to selectively deliver the coalescing agent onto portions of successive layers of build material at a third contone density lower than the first contone density and different from the second contone density, wherein the controller is to control the coalescing agent distributor to selectively deliver the coalescing agent at the third contone density onto the surface portions in a pattern associated with the third contone density in accordance with data, so that the build material is to solidify to form slices of a three-dimensional object based on a respective associated pattern, wherein the pattern associated with the third contone density is in different parts of the surface portions than the determined pattern so that the three-dimensional object achieves a second target surface roughness as a result of the third contone density of the pattern associated with the third contone density, the second target surface roughness being different from the target surface roughness to be achieved as a result of the second contone density of the determined pattern.

12. The additive manufacturing system of claim 1, comprising an energy source to apply energy to the coalescing agent, wherein the controller controls the energy source to apply sufficient energy to melt the build material on which the coalescing agent is applied.

13. A method comprising:
forming successive layers of build material;
determining a target surface roughness for a surface portion of the successive layers of build material;
determining a pattern among a plurality of patterns at which a coalescing agent is to be delivered to achieve the target surface roughness;
selectively depositing the coalescing agent in the determined pattern onto the surface portion of the successive layers of build material, the determined pattern at which the coalescing agent is to be delivered to result in a second contone density that is different from a first contone density of the coalescing agent delivered to an interior portion of the successive layers of build material, wherein the second contone density includes formation of spaces between drops of the coalescing agent; and
selectively delivering a coalescence modifier agent onto the successive layers of build material and in at least some of the spaces between the drops of the coalescing agent, wherein the coalescence modifier agent is to reduce or prevent coalescence of build material on which the coalescence modifier agent has been delivered.

14. A non-transitory computer readable storage medium including executable instructions that, when executed by a processor, cause the processor to:
obtain data representing a three-dimensional object to be generated, the data including an interior portion and a surface portion of layers of build material defining where a coalescing agent is to be delivered at a first contone density;
determine a target surface roughness of the surface portion of the layers of build material;
determine a pattern among a plurality of patterns at which the coalescing agent is to be delivered to achieve the target surface roughness, the determined pattern to result in a second contone density different from the first contone density;
modify the data in the surface portion to define that the coalescing agent is to be delivered at the determined pattern to result in the second contone density;
selectively deliver the coalescing agent at the first and second contone densities respectively onto an interior portion and the surface portion of the layers of build material, wherein the second contone density includes formation of spaces between drops of the coalescing agent; and
selectively deliver a coalescence modifier agent in at least some of the spaces between the drops of the coalescing agent, wherein the coalescence modifier agent is to reduce or prevent coalescence of build material on which the coalescence modifier agent has been delivered.

* * * * *